US010478761B2

(12) United States Patent
Kreibig

(10) Patent No.: US 10,478,761 B2
(45) Date of Patent: Nov. 19, 2019

(54) FILTER DEVICE

(71) Applicant: HYDAC FLUIDCARECENTER GMBH, Sulzbach/Saar (DE)

(72) Inventor: Micha Kreibig, Rehlingen-Siersburg (DE)

(73) Assignee: HYDAC FLUIDCARECENTER GMBH, Sulzbach/Saar (DE)

( * ) Notice: Subject to any disclaimer, the term of this patent is extended or adjusted under 35 U.S.C. 154(b) by 453 days.

(21) Appl. No.: 15/309,496

(22) PCT Filed: May 15, 2015

(86) PCT No.: PCT/EP2015/001010
§ 371 (c)(1),
(2) Date: Nov. 8, 2016

(87) PCT Pub. No.: WO2015/176811
PCT Pub. Date: Nov. 26, 2015

(65) Prior Publication Data
US 2017/0173503 A1  Jun. 22, 2017

(30) Foreign Application Priority Data
May 17, 2014  (DE) .................. 10 2014 007 312

(51) Int. Cl.
*B01D 29/23* (2006.01)
*B01D 35/30* (2006.01)

(52) U.S. Cl.
CPC ............. *B01D 29/23* (2013.01); *B01D 35/30* (2013.01); *B01D 2201/29* (2013.01);
(Continued)

(58) Field of Classification Search
CPC ...... B01D 29/111; B01D 29/54; B01D 29/21; B01D 29/23; B01D 35/30;
(Continued)

(56) References Cited

U.S. PATENT DOCUMENTS 6,235,194 B1 * 5/2001 Jousset .................. B01D 29/15
210/206
2003/0146149 A1 8/2003 Binder et al.
(Continued)

FOREIGN PATENT DOCUMENTS

DE           43 22 226        1/1995
DE     10 2004 005 210        8/2005
(Continued)

OTHER PUBLICATIONS

International Search Report (ISR) dated Jul. 21, 2015 in International (PCT) Application No. PCT/EP2015/001010.
(Continued)

Primary Examiner — Benjamin L Lebron
(74) Attorney, Agent, or Firm — Wenderoth, Lind & Ponack, L.L.P.

(57) ABSTRACT

A filter device has a filter housing (2, 4) accommodating a filter element (16) separating an unfiltered substance chamber (26) from a filtrate chamber (20) within the filter housing (2, 4). The filter element (16) is sealed against the filter housing (2, 4) by a sealing device (36, 40). The filter element (16) is mounted inside the filter housing (2, 4) using movable bearings (32, 38).

17 Claims, 2 Drawing Sheets

(52) U.S. Cl.
CPC .. *B01D 2201/291* (2013.01); *B01D 2201/295* (2013.01); *B01D 2201/30* (2013.01); *B01D 2201/304* (2013.01); *B01D 2201/34* (2013.01); *B01D 2201/347* (2013.01)

(58) Field of Classification Search
CPC ........ B01D 2201/295; B01D 2201/304; B01D 2201/347; B01D 2201/0415; B01D 2201/291; B01D 2201/305; B01D 2201/34; B01D 2201/4084; B01D 2201/29; B01D 2201/30
See application file for complete search history.

(56) References Cited

U.S. PATENT DOCUMENTS

| | | | | |
|---|---|---|---|---|
| 2005/0035053 | A1* | 2/2005 | Engelhard | B01D 29/114 210/437 |
| 2010/0126125 | A1* | 5/2010 | Dworatzek | B01D 29/21 55/419 |

FOREIGN PATENT DOCUMENTS

| | | |
|---|---|---|
| DE | 10 2007 046 208 | 4/2009 |
| DE | 10 2009 015 094 | 10/2010 |
| EP | 1 306 117 | 5/2003 |
| EP | 1 388 360 | 2/2004 |

OTHER PUBLICATIONS

Lager (Statik)—Wikipedia, cited in the German Examination Report.

* cited by examiner

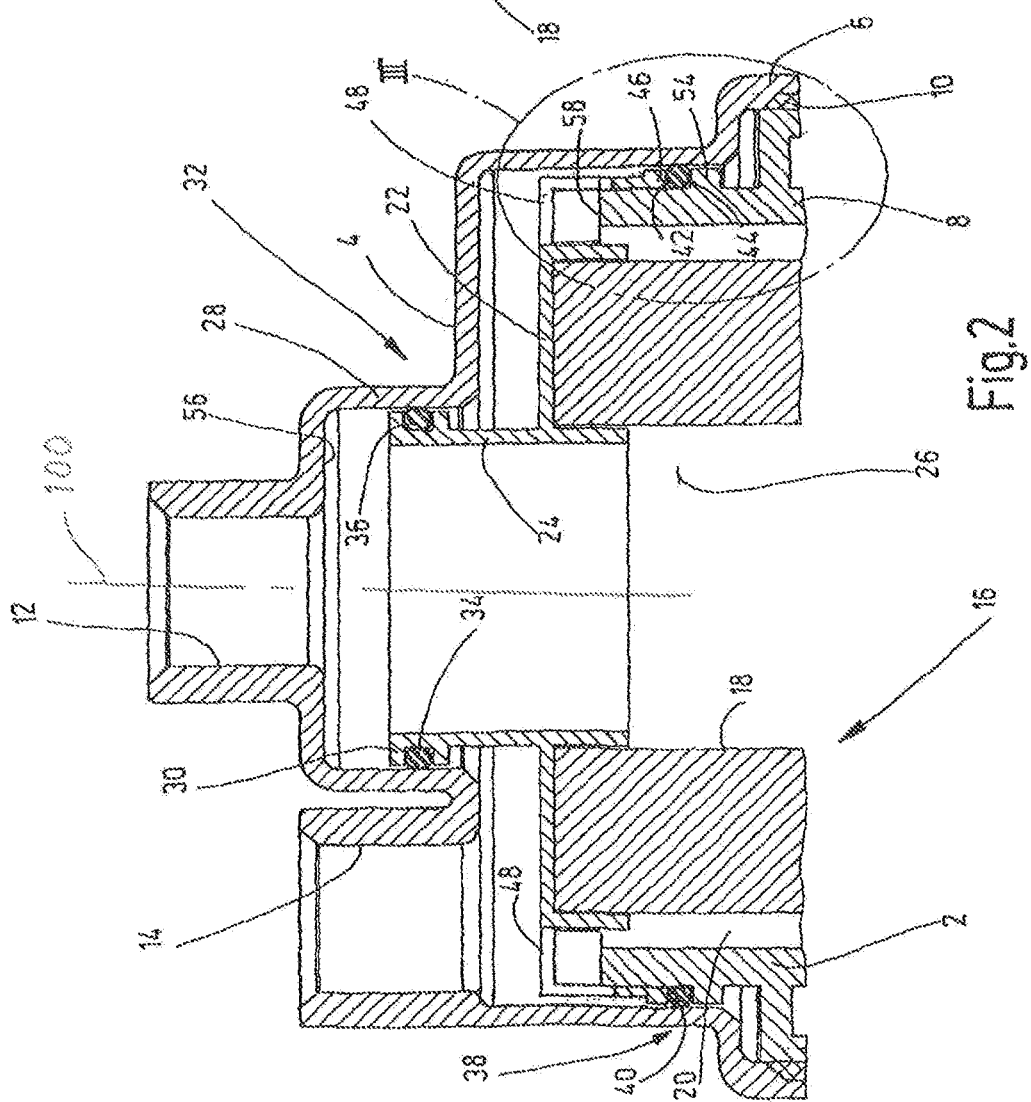

FILTER DEVICE

FIELD OF THE INVENTION

The invention concerns a filter device comprising a filter housing, which holds a filter element that separates an unfiltrate chamber from a filtrate chamber inside the filter housing. The filter element is sealed against the filter housing by a sealing device.

BACKGROUND OF THE INVENTION

Filter devices of this kind (DE 10 2007 046 208 A1) are prior art, are available in the most diverse designs, different dimensions, filter characteristics and other specifications, and are used in many applications for the filtration of fluids of all kinds. When used to filter operating fluids in engineering equipment, for example hydraulic fluids, fuel or lubricants, cooling liquids and the like, the filter devices are often installed in locations where they are subjected to vibrational loads in operation. This environment is the case when filter devices are used in mobile machinery such as excavators, front-end loaders, mobile cranes, forklifts and the like. Vibrations that act on the filter element can cause the destabilization of the respective filter medium, which causes a reduction in filter performance.

SUMMARY OF THE INVENTION

In this respect, an object of the invention to provide an improved filter device that is characterized by an increased resistance to reduced effectiveness caused by vibrations.

This object is basically met according to the invention by a filter device having, as one significant feature of the invention, a filter element supported inside the filter housing solely by floating bearings. The combination of a partially moveable support allows for a vibration-dampened retention of the filter element, and thus, an improvement in operational reliability of a filter device that is subjected to vibrational loads.

A particularly effective vibration damping effect can be achieved through the support if the bearings act mainly in vertical directions with respect to each other. When the device is in operation, a first floating bearing acts mainly in horizontal, radial direction and a second floating bearing acts in vertical, axial direction.

In a particularly advantageous manner, the respective bearing may be provided with a sealing ring of the sealing device. By the sealing ring, the filter element is sealed against the filter housing.

Particularly favourable conditions concerning the damping of vibrations are obtained if the respective sealing ring that forms part of the bearing is elastically flexible, preferably of an elastomeric material.

In particularly advantageous exemplary embodiments, the sealing ring that forms part of the first floating bearing is disposed between a connection point of the filter element and a head of the filter housing. The sealing ring that forms part of the second floating bearing is disposed between the filter head and a filter bowl of the filter housing. Thus, in the overall connection between filter element and filter bowl of the housing, which connection is obtained through the floating bearing between the filter element and the filter housing head and through the fixed bearing between the filter housing head and the filter housing bowl, an elastomeric bearing element each is provided for achieving an effective vibration damping effect by the formed support.

In particularly advantageous exemplary embodiments, the one end cap of the filter element, which end cap forms the connection point, is provided with a support surface that overlaps the filter bowl. The support surface compresses, with increasing connection between filter head and filter bowl, the bearing-sealing ring, which acts primarily in vertical direction, against a further support surface in such a way that the sealing ring widens in radial direction. The elastomeric, compressed sealing ring then forms a pretensioned damping element between the support surfaces of the fixed bearing.

In a particularly advantageous manner, the further support surface for the bearing-sealing ring that forms the second floating bearing is made as part of the filter bowl and that the one support surface forms a closed external circumference ring. The closed external circumference ring is attached via connecting webs to the other parts of the end cap and is provided with a shoulder at the outer circumference above the second floating bearing. The shoulder at the outer circumference ring of the end cap facilitates the compression of the sealing ring of the second floating bearing.

The sealing ring that forms part of the first floating bearing may be located in a circumferential groove of a cylindrical extension of the end cap, which delimits the connection point and may be brought in contact with a cylindrical connection part of the filter head. The floating bearing then forms simultaneously a seal of the fluid passage between the connection point of the end cap and the internal cavity of the filter element into which the cylindrical extension protrudes and that forms, for example, the unfiltrate side in the filtering process.

To achieve particularly good damping characteristics, the diameter of the sealing ring that co-forms the first floating bearing is preferably smaller than the diameter of the sealing ring that co-forms the second floating bearing, where both bearings are located at a distance from each other in axial direction so that the filter element is supported essentially free of vibrations inside the filter housing.

An object of the invention is also a filter element that is provided in particular for use in a filter device according to the invention. The filter element comprises a filter material that extends between two end caps, where at least one of the end caps of the filter element is provided with receptacles for the components of two bearings. The working direction of the two bearings extends essentially vertical to each other.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 2 is a side view in section of the exemplary embodiment of FIG. 1, depicted in a slightly larger scale compared to FIG. 1, in which only the upper device part in the vicinity of the filter housing head is shown, and FIG. 3 is an enlarged side view in section of the area marked with III in FIG. 2.

DETAILED DESCRIPTION OF THE INVENTION

Figure 1:
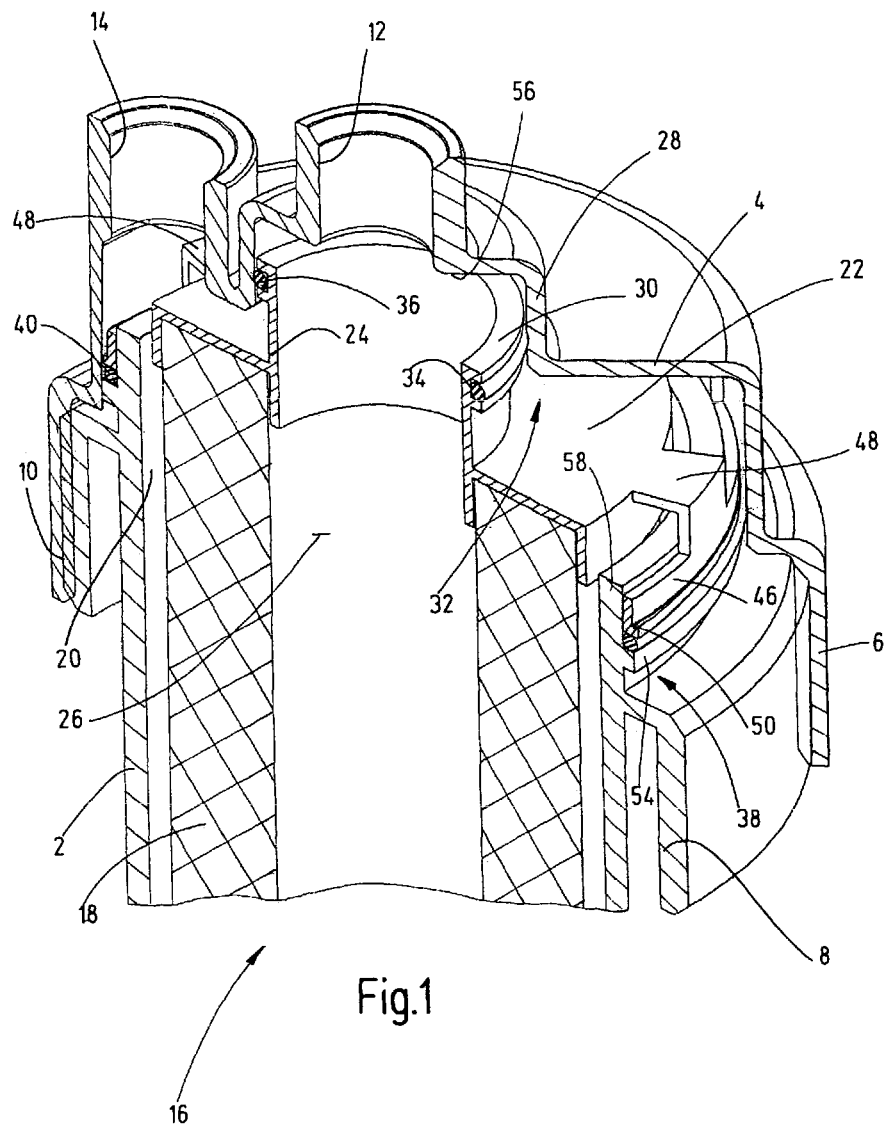
FIG. 1 illustrates an upper part of an exemplary embodiment of a filter device according to the invention in a perspective view and with different cross-sections in longitudinal direction.

The exemplary embodiment of the filter device according to the invention shown in the drawings comprises a filter housing in form of a circular, cylinder-shaped filter bowl 2. The drawings only depict the section of the filter bowl upper, open end. The filter bowl has a closed bowl bottom (not shown). The filter bowl 2 may be closed at the upper end by a filter head 4 that forms an end cap. The end cap overlaps with a skirt-shaped, axially protruding collar 6 over an annular body 8 of the housing bowl 2. The annular body 8 forms a radial projection on the filter bowl 2. To facilitate the attachment of the filter head 4 to the filter bowl 2, a thread 10 is formed between the collar 6 of the filter head 4 and the annular body 8 of filter bowl 2. A fluid inlet 12, arranged coaxial to the cylinder or longitudinal axis 100, is disposed at the upper end of the filter head 4 for the supply of unfiltrate. A fluid outlet 14 is provided, radially offset from the fluid inlet, for the filtrate discharge.

The filter element 16, which may be inserted into the filter bowl 2, comprises a hollow, cylinder-shaped filter medium 18 that is bounded at each end by an end cap, as is usual with filter elements of this kind. The drawings only show the upper end cap 22 that is assigned to the filter head 4. For the purpose of forming a connection point through which the filter element 16 can be connected to the fluid inlet 12, the end cap 22 is provided with a coaxial, cylindrical extension 24. Extension 24 forms the fluid passage from the filter head 4, attached to filter bowl 2, from the fluid inlet 12 to the internal filter cavity 26 surrounded by the filter medium 18. From the filter cavity 26, which forms the unfiltrate chamber in operation, the fluid flows, after flowing through the filter medium 18, into the filtrate chamber 20 located on the outside of the filter cavity 26, and from there to the fluid outlet 14 of the filter head.

To provide a sealed connection between the extension 24 of the end cap 22, which forms the connection point, and the fluid inlet 12, the filter head 4 is provided with a cylindrical connector 28. Connector 28 cups the edge 30 of the extension 24 when the filter head 4 is attached to filter bowl 2. A first support point is provided between the edge 30 and the connector 28 in form of a first floating bearing 32 to support the filter element 16. This bearing is called a "floating bearing" because this support point provides support in horizontal, radial direction, relative to longitudinal axis 100, but has no support surfaces that act in the vertical, axial direction along longitudinal axis 100. To describe it more accurately, the floating bearing 32 comprises a circumferential groove 34 in the vicinity of the top edge 30 of the extension 24 of the end cap 32, where a sealing ring 36 is radially compressed between the base of the groove 34 and the inside of the cylindrical connector 28 of the filter head 4. The first floating bearing 32 then forms via the sealing ring 36 not only the sealing function of the filter element 16, but also provides support in horizontal direction.

The filter element 16 is supported on filter head 4, which is attached to the filter housing head, via a second support point in form of a second floating bearing 38. Like the first floating bearing 32, the second bearing 38 comprises a sealing ring 40 as a bearing component, so that the bearing 38 simultaneously provides a sealing function. The bearing point that comprises the sealing ring 40 is called a "floating bearing" because, when the filter head 4 is attached to the filter bowl 2, that is, when screwing the filter head 4 tight, the sealing ring 40 is compressed in vertical direction only by the weight of the filter element 16 between a first support surface 42, which is provided on the upper end cap 22, and a second support surface 44. The first support surface 42 is located on an external circumference or cap ring 46, which surrounds the main part of the upper end cap 22 as a closed annual body at a radial distance and is attached to the main part via radially extending connecting webs 48. To facilitate the vertical, axial compressing of the sealing ring 40, the circumference ring 46 is provided with a shoulder 50 in form of a radially protruding annular rib that forms the first support surface 42. First support surface 42 compresses the sealing ring 40 against the further or second support surface 44 through the weight of the filter element 16. The further support surface 44 is located on an annular rib 54 that protrudes radially from the filter housing bowl 2. Due to the axial compression the sealing ring 40 is widened in radial direction and then forms not only a seal, but also a support. Sealing ring 40 seals in radial direction between filter housing bowl 2 and filter housing head 4. In other words, this forms a seal of the filtrate chamber 20 towards the outside of the filter housing.

Due to the fact that two support points are disposed at an axial distance from each other formed by the two floating bearings 32, 38 and enable relative movements in axial direction, and because floating bearing 32 as well as floating bearing 38 comprise, as support elements, elastomeric sealing rings 36 and 40, respectively, the filter element support as a whole has an overall vibration damping effect and provides for a reliable operation of the filter element 16 when vibration loads occur in operation. Because the filter element 16 may move axially, counter to the force of the weight, the internal boundary surface 56 of the connector 28 of the head 4, which adjoins fluid inlet 12, forms an end-stop surface for the rim 30 of the extension 24 of the end cap 22. Axial movements are then limited to an amount at which the circumferential ring 46 of the end cap 22 still remains in a position in which it cups the rim 58 of the filter bowl 2. As a result of the floating bearings, the filter element is supported in the filter housing in a "floating" manner and is able to adjust itself correspondingly in vertical orientation when the entire filter device is installed in a normal position. In particular, during filtration, it will find its own sealing position due to the fluid pressure.

While one embodiment has been chosen to illustrate the invention, it will be understood by those skilled in the art that various changes and modifications can be made therein without departing from the scope of the invention as defined in the claims.

The invention claimed is:
1. A filter device, comprising:
   a filter housing having a filter head and a filter bowl and having a longitudinal axis;
   a filter element inside said filter housing and separating an unfiltrate chamber from a filtrate chamber inside said filter housing; and
   first and second floating bearings solely supporting said filter element in said filter housing and having first and second sealing rings, respectively, said first sealing ring being between a connection point of said filter element with said filter head and sealing said connection point, said second sealing ring being between and in direct sealing contact with said filter head and said filter bowl.
2. A filter device according to claim 1 wherein
   said first and second floating bearings are spaced in an axial direction along said longitudinal axis with respect to one another, with said first floating bearing acting primarily in a radial direction relative to said longitu- dinal axis in operation and with said second floating bearing acting primarily in an axial direction relative to said longitudinal axis.

3. A filter device according to claim 1 wherein said first and second sealing rings are essentially flexible.

4. A filter device according to claim 3 wherein said first and second sealing rings are of elastomeric material.

5. A filter device according to claim 1 wherein said filter element comprises an end cap forming said connection point and having a first support surface overlapping said filter bowl, said first support surface compressing said second sealing ring with increasing connection between said filter head and said filter bowl primarily in an axial direction relative to the longitudinal axis against a second support surface and widening said second sealing ring in a radial direction relative to said longitudinal axis.

6. A filter device according to claim 5 wherein said second support surface is a fixed part of said filter bowl.

7. A filter device according to claim 5 wherein said first support surface forms a closed external circumference ring being attached by connecting webs to other parts of said end cap and having a shoulder at an outer circumference of said closed external circumference ring axially above said second floating bearing relative to said longitudinal axis.

8. A filter device according to claim 1 wherein said first sealing ring is located in a circumferential groove in a cylindrical extension of an end cap of said filter element delimiting said connection point, with said first sealing ring being in direct contact with a cylindrical connection part of said filter head.

9. A filter device according to claim 1 wherein said first sealing ring has a diameter less than a diameter of said second sealing ring, said first and second sealing rings being located at a distance from one another in an axial direction thereof relative to said longitudinal axis such that said filter element is supported essentially free of vibrations inside said filter housing.

10. A filter device, comprising:
a filter housing having a filter head connected to a filter bowl and having a longitudinal axis;
a filter element being inside said filter housing and separating an unfiltrate chamber from a filtrate chamber inside said filter housing;
said filter head having a tubular connector extending axially relative to said longitudinal axis toward said filter bowl;
an end cap on said filter element, said end cap having a tubular extension extending axially relative to said longitudinal axis said tubular extension and said tubular connector being coaxial and being movable relative to one another relative to said longitudinal axis;
a first sealing ring between said tubular connector and said tubular extension;
a circumference ring extending from and being fixed to said end cap and having a first support surface thereon extending radially relative to said longitudinal axis;
an annular rib fixedly extending from said filter housing and having a second support surface thereon facing said first support surface and extending radially relative to said longitudinal axis, said first and second support surfaces being movable relative to one another; and
a second sealing ring between said first and second support surfaces.

11. A filter device according to claim 10 wherein said annular rib extends radially outwardly from said filter bowl relative to said longitudinal axis;
said circumference ring coaxially surrounds said filter bowl.

12. A filter device according to claim 10 wherein said first sealing ring is mounted in an annular groove in radially outer surface of said tubular extension and directly contacts a radially inner surface of said tubular connector relative to said longitudinal axis.

13. A filter device according to claim 10 wherein said first and second sealing rings are essentially flexible.

14. A filter device according to claim 10 wherein said first and second sealing rings are axially spaced from one another along said longitudinal axis.

15. A filter device according to claim 14 wherein said first sealing ring has an outer diameter less than an outer diameter of said second sealing ring.

16. A filter device according to claim 10 wherein said first sealing ring has an outer diameter less than an outer diameter of said second sealing ring.

17. A filter device according to claim 10 wherein said end cap is axially movable in said filter housing with said filter head being fixedly connected with said filter bowl.

\* \* \* \* \*